(12) United States Patent
Lemoine et al.

(10) Patent No.: US 12,493,501 B2
(45) Date of Patent: Dec. 9, 2025

(54) METHOD FOR DIMENSIONING AN ELECTRIC POWER RESERVED BY BASE STATIONS

(71) Applicant: Orange, Issy-les-Moulineaux (FR)

(72) Inventors: Benoît Lemoine, Chatillon (FR); Anca Niculescu, Bucharest (RO); Jean-François Boussardon, Chatillon (FR); Joël Penhoat, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 558 days.

(21) Appl. No.: 17/779,496

(22) PCT Filed: Nov. 26, 2020

(86) PCT No.: PCT/FR2020/052190
§ 371 (c)(1),
(2) Date: May 24, 2022

(87) PCT Pub. No.: WO2021/105624
PCT Pub. Date: Jun. 3, 2021

(65) Prior Publication Data
US 2022/0413944 A1     Dec. 29, 2022

(30) Foreign Application Priority Data

Nov. 29, 2019 (FR) ........................................ 1913554

(51) Int. Cl.
*G06F 9/50* (2006.01)
*G06F 9/455* (2018.01)
*H04W 52/02* (2009.01)

(52) U.S. Cl.
CPC ........ *G06F 9/5094* (2013.01); *G06F 9/45558* (2013.01); *G06F 9/5077* (2013.01);
(Continued)

(58) Field of Classification Search
CPC .. G06F 9/5094; G06F 9/45558; G06F 9/5077; G06F 2009/4557; G06F 9/45533; H04W 52/0206; Y02D 30/70; Y02D 10/00
See application file for complete search history.

(56) References Cited

U.S. PATENT DOCUMENTS

2007/0101173 A1* 5/2007 Fung .................... G06F 1/3209
713/300
2007/0280175 A1* 12/2007 Cheng ................... H04W 72/20
370/338

(Continued)

FOREIGN PATENT DOCUMENTS

WO     WO 2015/126430 A1     8/2015

OTHER PUBLICATIONS

International Search Report for PCT Application No. PCT/FR2020/052190, dated Mar. 4, 2021.

*Primary Examiner* — Abu Zar Ghaffari
(74) *Attorney, Agent, or Firm* — Knobbe, Martens, Olson & Bear, LLP (57) ABSTRACT

A method regarding electric power for at least one current base station among a plurality of base stations that are connected to a virtualization manager of a network infrastructure. The method is implemented by the virtualization manager, the method includes receiving a request for dimensioning electric power that is reserved; configuring, according to the dimensioning request, at least one server of the at least one current base station; and controlling, according to the configuration of the at least one server, at least one virtual computing resource of the network infrastructure, so as to dimension the reserved electric power.

12 Claims, 8 Drawing Sheets

(52) U.S. Cl.
CPC ..... *H04W 52/0206* (2013.01); *G06F 9/45533* (2013.01); *G06F 2009/4557* (2013.01); *Y02D 10/00* (2018.01); *Y02D 30/70* (2020.08)

(56) References Cited

U.S. PATENT DOCUMENTS

| | | | | |
|---|---|---|---|---|
| 2009/0144568 | A1* | 6/2009 | Fung | G06F 1/324 |
| | | | | 713/300 |
| 2009/0187776 | A1* | 7/2009 | Baba | G06F 1/324 |
| | | | | 713/320 |
| 2011/0246647 | A1* | 10/2011 | Marquezan | H04L 47/782 |
| | | | | 709/224 |
| 2016/0066214 | A1* | 3/2016 | Buddhikot | H04W 16/14 |
| | | | | 455/454 |
| 2017/0064031 | A1* | 3/2017 | Sunay | H04W 28/18 |
| 2017/0223712 | A1* | 8/2017 | Stephens | H04W 72/0446 |
| 2017/0237646 | A1* | 8/2017 | Fabjanski | G06F 8/71 |
| | | | | 709/224 |
| 2017/0237647 | A1* | 8/2017 | N | H04L 41/122 |
| | | | | 709/224 |
| 2018/0165167 | A1* | 6/2018 | Yang | G06F 9/5022 |
| 2018/0262912 | A1* | 9/2018 | Goldhamer | H04L 69/22 |
| 2018/0302807 | A1* | 10/2018 | Chen | H04W 72/1263 |
| 2018/0349195 | A1 | 12/2018 | El Khayat et al. | |
| 2019/0109891 | A1* | 4/2019 | Paruchuri | G06Q 50/06 |
| 2020/0026318 | A1* | 1/2020 | Forbes, Jr. | H02J 3/14 |
| 2020/0310394 | A1* | 10/2020 | Wouhaybi | H04L 67/1051 |
| 2020/0310886 | A1* | 10/2020 | Rajamani | G06F 9/45558 |
| 2021/0099976 | A1* | 4/2021 | Mueck | H04W 72/04 |

\* cited by examiner

METHOD FOR DIMENSIONING AN ELECTRIC POWER RESERVED BY BASE STATIONS

CROSS-REFERENCE TO RELATED APPLICATIONS

This application is filed under 35 U.S.C. § 371 as the U.S. National Phase of Application No. PCT/FR2020/052190 entitled "METHOD FOR DIMENSIONING AN ELECTRICAL POWER RESERVED BY BASE STATIONS" and filed Nov. 26, 2020, and which claims priority to FR 1913554 filed Nov. 29, 2019, each of which is incorporated by reference in its entirety.

BACKGROUND

Field

This description relates to the field of telecommunications networks, and more specifically to methods and devices for dimensioning electric power reserved for base stations connected to a network infrastructure.

Description of the Related Technology

Current telecommunications networks make use of radio sites that comprise different types of equipment and offer fixed, wireless, and mobile communication services. This equipment includes in particular antennas, computers, and servers that are networked. In particular, this equipment is electrically powered and configured to meet the quality of service needs of telecommunications operators.

However, the constant increase in data rates required by users of telecommunications networks means that the consumption of electric power by the base stations of these networks is continually increasing. In addition, this consumption may vary over time due to events, planned or unplanned, as well as according to the geographical location of the mobile terminals of the users who connect to these base stations.

Currently, it is difficult to configure base stations and the equipment of such base stations in order to meet needs that may vary greatly and abruptly.

For example, a geographically isolated radio site may suddenly be stressed during the organization of a specific social event organized nearby, for example a music festival organized at the outskirts of a telecommunications operator's geographical coverage, during which a large number of users want to connect, which strains the radio site beyond its usual and normally expected capacity.

To take into account a sudden and possibly significant variation in the load of base stations, techniques are known for dimensioning the electric power supplied to base stations.

An example of a known dimensioning technique involves evaluating the average power consumption of a radio site, adding to this evaluation the amount of load that can be supplied by batteries if any for powering this radio site, and possibly including an additional margin which depends on the power tiers.

This type of dimensioning technique makes it possible to roughly evaluate the electric power reserved for a base station. As a reminder, electric power reserved by a set of base stations is defined as being the corresponding power capacity that the manager of these base stations can make available to satisfy a given request within a limited time interval.

Thus, most of the electrical systems included in these base stations are designed so that, under normal operating conditions, the power reserve is always at least equal to the capacity of the largest generator.

Dimensioning the reserved electric power therefore makes it possible to limit the electrical consumption of a system by imposing a power threshold that is less than or equal to a given value. This also allows ensuring that not all the electric power allocated to the base station is used, so that it can possibly be shared or redirected elsewhere.

However, the known techniques have numerous disadvantages, in particular during significant or unanticipated stresses. To overcome this, the reserved electric power is generally overdimensioned to ensure a sufficient margin.

For example, a power plant may be designed to supply electric power to two radio sites. Consequently, the power that the plant must be able to deliver must be greater than or equal to the sum of the maximum power consumed by each of these two radio sites. In particular, the dimensioning of the plant will be planned so that the reserved electric power is equal to the sum of the maximum power consumed by each of the two radio sites.

However, such overdimensioning implies that the distribution of electric power between one or more base stations is neither optimally nor flexibly distributed between each of the base stations. This is the case, in particular, in the event of a sudden increase or decrease in the electric power consumed by one or more of the base stations at the same time, for example due to a corresponding increase or decrease in network traffic handled by a plurality of base stations.

In addition, known dimensioning techniques do not allow for the best distribution of the reserved electric power, and in practice are not applicable for base stations comprising a large amount of equipment.

In addition, overdimensioning imposes additional constraints in terms of the resources used by these base stations, or when the associated infrastructure is of low capacity. For example, the size of the base station's power supply batteries must also be overdimensioned in this case, which means they occupy more space. Similarly, the electrical cables used to connect a power plant to base stations must also be overdimensioned to allow the flow of the associated power and thus avoid problematic heating due to the Joule effect.

This also raises various issues concerning the waste of materials and energy, and the distribution of resources in general.

Since it is not necessary to constantly provide overdimensioned electric power to base stations, there is a need for methods and devices that allow more flexibility in how base stations are powered, and in particular for managing the distribution of electric power between several radio sites.

There is also a need for methods and devices making it possible to optimize the quality of service provided by the operators of these base stations, in particular to reduce the amount of resources used by the stations, in order to reduce the amount of energy consumed, to avoid wasting resources.

The purpose of this disclosure is to make improvements to the state of the art.

SUMMARY

The methods and devices for powering base stations, and in particular base stations used in the field of telecommunications networks, therefore require new dimensioning techniques in order to achieve better levels of performance.

In order to improve the situation and respond to the disadvantages described above, a method is proposed, according to a first object, for dimensioning an electric power reserved by at least one current base station among a plurality of base stations that are connected to a virtualization manager of a network infrastructure, said method being implemented by said virtualization manager, the method comprising the following steps:

receiving a request for dimensioning the reserved electric power;

configuring, according to said dimensioning request, at least one server of the at least one current base station; and controlling, according to the configuration of said at least one server, at least one virtual computing resource of the network infrastructure, said virtual computing resource consuming a part of the reserved electric power, so as to dimension the reserved electric power.

Herein, a virtualization manager is, in general, a device configured to be able to guarantee the supply of electric power to base stations in the event of a cutoff or interruption in the supply of electric power to these base stations, or in the event of an overload caused by a peak in demand.

Typically, the reserved electric power can be dimensioned to supply sufficient power to the equipment of these base stations, and in particular to their servers.

As used herein, a base station is any equipment installed at a radio site and fitted with a transceiver antenna with which mobile terminals can communicate, for example in order to gain access to a telecommunications network. In general, a base station allows all terminals present in the geographical area covered by the base station to connect to the network.

As used herein, a computing resource is a resource that can be consumed or provided by a computing device. For example, a server is hardware able to supply computing resources to a base station to which it is connected.

As used herein, a distinction is made between physical computing resources and virtual computing resources. Without limitation, a physical computing resource is a computing, storage, network, or energy resource provided by a physical server. A virtual computing resource is any computing resource that can be moved and/or shared between several computer devices, and such that these devices do not have direct information on the origin or destination of this resource. A virtual computing resource may also be computing, storage, network, or energy, and thus may generally include files, connections to the network infrastructure, memory areas, etc.

As used herein, the term "network" designates different types of networks, including telecommunications networks and data communication networks, whether they provide fixed or mobile services. The expression "network" also designates any network service operating on a network infrastructure in which virtual functions are deployed. In other words, the embodiments described herein may also be applied in the case of network infrastructures using one or more dedicated hardware elements in the form of physical functions of the PNF type ("Physical Network Function").

In a non-limiting manner, the method applies to the dimensioning of an electric power reserved by several current base stations among the plurality of base stations connected to the virtualization manager of the network infrastructure. It is thus possible to simultaneously configure several servers of several base stations at the same time.

The method of the first object thus makes it possible to adjust the dimensioning of the electric power reserved by base stations according to several criteria, among which is the maximum electric power that can be delivered by an electric power supply device supplying the set of base stations and the electric power used by each of the base stations.

The reserved electric power can thus be distributed between at least one current base station and one or more of the other base stations comprised in the plurality.

In one particular embodiment, the configuration of said at least one server comprises a shutdown of the server, and the control of said at least one virtual computing resource comprises a freeing, by a control module comprised in the virtualization manager, of the at least one virtual computing resource.

Herein, the server to be shut down is initially activated and in an operating phase or a standby phase.

It is thus possible to reduce the reserved electric power and the dimensioning thereof. This makes it possible to recover electric power from a subset of base stations by switching off or placing on standby one or more servers in this subset of base stations, for example radio stations.

This makes it possible to distribute electric power between several base stations while reducing the electric power reserved by at least one current base station.

In one particular embodiment, the dimensioning request comprises a request to reduce the reserved electric power, said reduction request being sent by an electric power control device to an environmental control module comprised in the virtualization manager, said electric power control device being connected to the at least one current base station.

It is thus possible to automate the implementation of a dimensioning of a power reserved by a plurality of base stations, based on knowledge of the electric powers reserved and/or consumed by one or another of these base stations.

In one possible alternative embodiment, the dimensioning request comprises a request to reduce the electric power consumed by the at least one current base station.

In another possible alternative embodiment, the dimensioning request comprises a notification indicating that a power consumed by a base station among the plurality is less than the electric power reserved by said at least one current base station.

In one particular embodiment, the release of the at least one virtual computing resource comprises, upon shutdown of the server, a deletion of at least one virtual function in the network infrastructure, said deletion being implemented by a virtual functions management module comprised in the virtualization manager.

The deletion of such a virtual function thus makes it possible to dimension the electric power reserved by the plurality of base stations, by reducing it.

Herein, the virtualization of functions in the form of virtual functions (VNF, or "Virtual Network Function") consists of decoupling the network functions from the dedicated physical equipment in order to deploy the network functions in storage spaces that are more or less distributed and/or by relying on generic servers.

Herein, a virtual function comprises a set of software components executable on a server such as a virtual machine (VM), or a container within the network architecture, which is then said to be virtualized.

Herein, the term virtual machine also includes the term container. The deployment of a network service established based on virtual functions therefore consists of placing the various components of the virtual functions in virtual machines having the resources required for the execution of the virtual functions and subsequently for the proper implementation of the service. These resources, whether they are computing, storage, network, or energy resources, are provided by the network infrastructure hosting these virtual machines/containers.

These virtual functions make it possible to offer an improved quality of service and to satisfy the requirements of network functions, such as functions relating to telecommunications networks (RAN, or "Radio Access Network"). It is thus possible to modify the dimensioning of the electric power reserved by a base station without affecting the quality of service.

In addition, the use of virtual functions rather than physical functions is advantageous in that it is possible to move these virtual functions within the network infrastructure.

In one particular embodiment, the configuration of said at least one server comprises an activation of the server, and the control of said at least one virtual computing resource comprises an allocation, by a control module comprised in the virtualization manager, of the at least one virtual computing resource on the activated server.

Herein, the server to be activated is initially off.

Herein, the activation of a server may correspond to placing this server in a phase selected among a standby phase, a start-up phase, or a steady-state-on phase.

It is thus possible to increase the reserved electric power, and therefore its dimensioning. This makes it possible to distribute the electric power of a subset of base stations by activating one or more servers in this subset of base stations.

In one particular embodiment, the dimensioning request comprises a notification that the reserved electric power has been exceeded, said exceeded-reserve notification being issued by a hypervisor module comprised in the virtualization manager, or a notification of an increase in traffic issued by a virtual functions management module comprised in the virtualization manager.

In one possible alternative embodiment, the dimensioning request comprises a notification of an increase in traffic managed by one of the base stations or a request to instantiate a virtual function.

Herein, said traffic may increase on a virtual function present on a server.

In one particular embodiment, the allocation of the at least one virtual computing resource comprises, upon activation of the server, an instantiation of at least one virtual function in the network infrastructure, said instantiation being implemented by a virtual functions management module comprised in the virtualization manager.

The instantiation of the at least one virtual function thus makes it possible to dimension the electric power reserved by the plurality of base stations, since this virtual function instance typically consumes electrical energy.

In one particular embodiment, the at least one virtual computing resource is an electric power virtual computing resource comprising a component selected among a compute component, a storage component, a memory component, and a network component.

Herein, and as an example, a computing resource may be a resource of the following types: CPU, GPU (Graphics Processing Unit), RAM (Random Access Memory), ROM (Read-Only Memory), or, in a non-limiting manner, DISK, the DISK type comprising the HDD (Hard Disk Drive) type and the SDD (Solid State Drive) type.

This makes it possible to optimize the dimensioning of the reserved electric power according to the type of resource allocated, since the electric power used by each type of resource is different and can change over time.

According to a second object, a computer program is also proposed, comprising instructions for implementing the method according to one of the embodiments of the first object, when said instructions are executed by a processor of a computer processing circuit.

According to a third object, an information storage medium is also proposed, removable or non-removable, partially or entirely readable by a computer or a processor, comprising code instructions of a computer program for the execution of each of the steps of the method according to any one of the embodiments of the first object.

According to a fourth object, a virtualization manager of a network infrastructure is also proposed, said manager being configured to dimension an electric power reserved by at least one current base station among a plurality of base stations connected to the virtualization manager, the virtualization manager comprising:
 a virtual functions management module configured to receive a request for dimensioning the reserved electric power;
 an environmental control module configured to configure, according to said dimensioning request, at least one server of the at least one current base station; and
 a hypervisor module configured to control at least one virtual computing resource of the network infrastructure, said virtual computing resource consuming a part of the reserved electric power, so as to dimension the reserved electric power.

According to a fifth object, also proposed is a system comprising a virtualization manager according to the fourth object and a plurality of base stations configured to be connected to said virtualization manager.

BRIEF DESCRIPTION OF THE DRAWINGS

Other features, details, and advantages will become apparent upon reading the detailed description below, and upon analyzing the appended drawings, in which.

Unless otherwise indicated, elements that are the same or similar in multiple figures bear the same reference symbols and have identical or similar characteristics, so for simplicity these shared elements are generally not described again.

DETAILED DESCRIPTION OF CERTAIN ILLUSTRATIVE EMBODIMENTS

Figure 1:
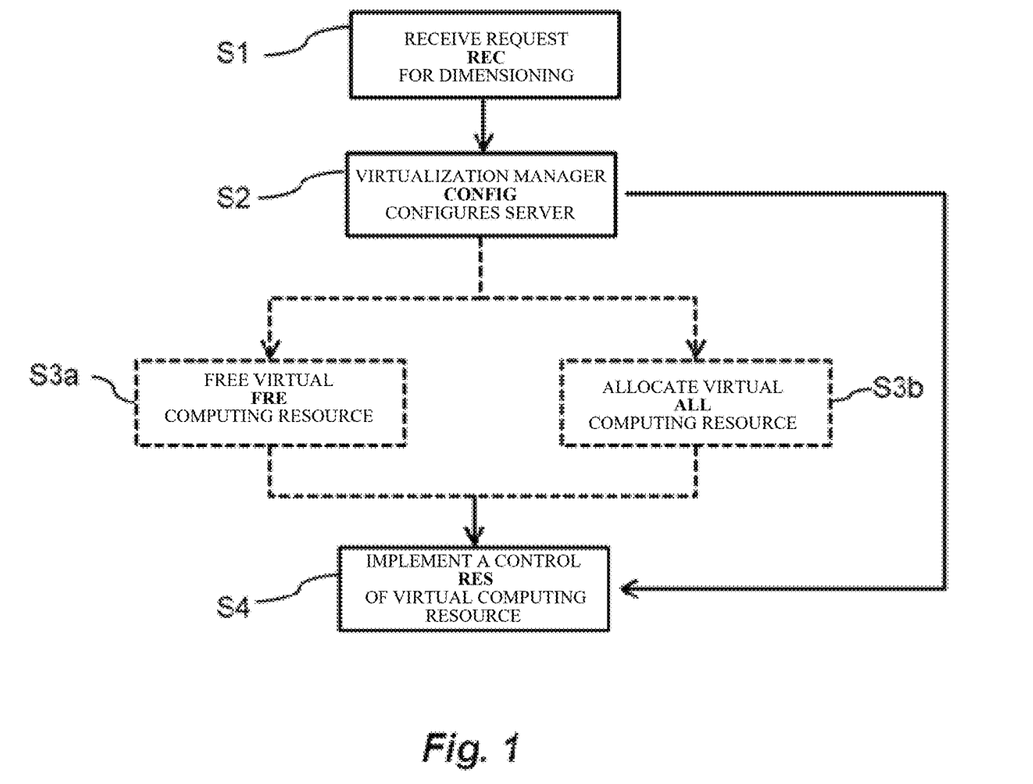
FIG. 1 represents, in the form of a flowchart, the steps of a method for dimensioning a reserved electric power according to a general exemplary embodiment.

FIG. 1 shows, in the form of a flowchart, steps S1, S2, S1a, S1b, and S4 of a method for dimensioning an electric power reserved by a plurality of base stations according to an exemplary embodiment. These steps are implemented by a virtualization manager of a network infrastructure which is connected to this plurality of base stations, as described below within the framework of an NFV architecture.

During a step S1, the virtualization manager receives a request for dimensioning a reserved electric power. This request informs the manager of a "scale-out" or "scale-in" request.

Herein, a "scale-out" is an upward scaling of the electric power reserved by one or more base stations, in order to dimension this reserved electric power so that its value is increased to above a predetermined value.

Typically, a "scale-out" comprises an activation of one or more physical computing devices, for example an activation of servers on standby, so as to be able to increase the number of instances of virtual functions or virtual machines deployed on this or these base stations, and allocate more computing resources to these instances, in particular energy virtual computing resources.

Herein, a "scale-in" is a downward scaling of the electric power reserved by one or more base stations, in order to dimension this reserved electric power so that its value is reduced to below a predetermined value.

Typically, a "scale-in" comprises a deactivation of one or more physical computing devices, for example a shutdown of servers on standby, so as to be able to reduce the number of instances of virtual functions or virtual machines deployed on this or these base stations, and release computing resources, in particular energy virtual computing resources.

During a step S2, the virtualization manager configures at least one server of one or more current base stations among the plurality of base stations. This configuration is implemented based on the nature of the dimensioning request, in accordance with the various embodiments described herein.

According to a first example, when the dimensioning request corresponds to a "scale-out" request, i.e. an upward scaling, the configuration by the virtualization manager comprises a step S3b of allocating at least one virtual computing resource, preferably an energy virtual computing resource, so as to increase the reserved electric power. As described below in the context of NFV architectures, this step S3b is implemented by a control module of the virtualization manager.

According to a second example, when the dimensioning request corresponds to a "scale-in" request, i.e. a downward scaling, the configuration by the virtualization manager comprises a step S3a of freeing at least one virtual computing resource, preferably an energy virtual computing resource, so as to reduce the reserved electric power. As described below in the context of NFV architectures, this step S3a is implemented by a control module of the virtualization manager.

During a step S4, following step S2, the virtualization manager then implements a control of at least one virtual computing resource of the network infrastructure, said virtual computing resource consuming a part of the reserved electric power, so as to dimension the reserved electric power.

In particular, when step S4 follows step S3a, the virtualization manager verifies that the freeing of the at least one virtual computing resource allows a reduction in the reserved electric power.

In particular, when step S4 follows step S3b, the virtualization manager verifies that the allocation of the at least one virtual computing resource allows an increase in the reserved electric power.

Figure 2:
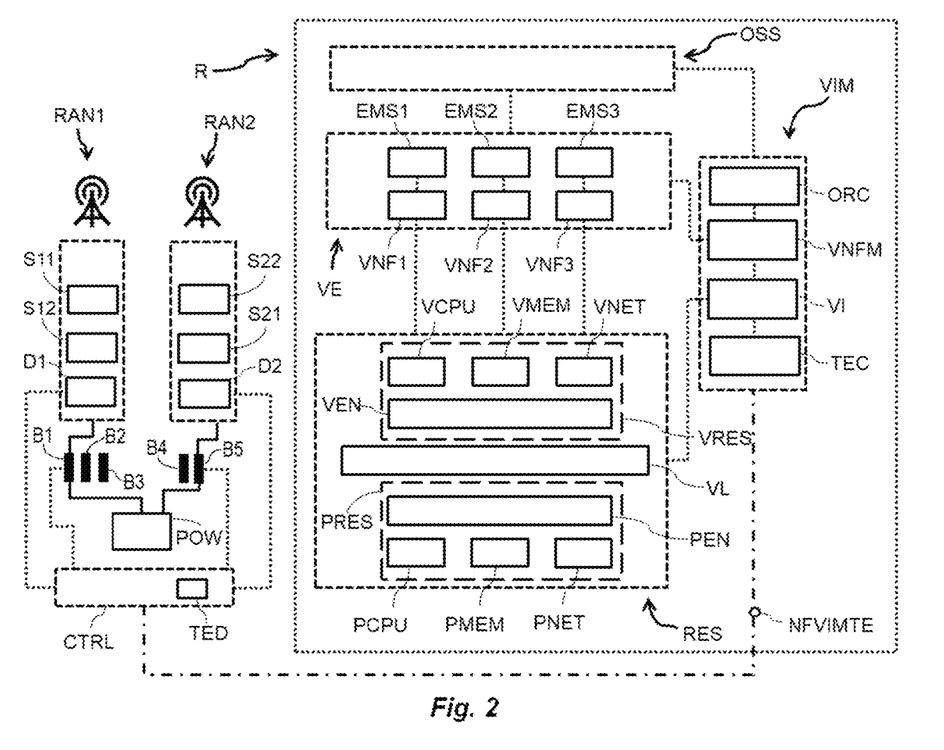
FIG. 2 represents a schematic view of a network infrastructure connected to a plurality of base stations according to an exemplary embodiment.

Reference is now made to FIG. 2, which shows a schematic view of a network infrastructure R connected to several base stations, here two base stations RAN1 and RAN2 in an exemplary embodiment.

As illustrated, the network infrastructure R comprises an NFV architecture as defined by ETSI (European Telecommunications Standards Institute).

This NFV architecture comprises a virtualized infrastructure NFVI ("Network Function Virtualization Infrastructure"), which provides hardware resources such as servers or circuit boards, as well as virtual resources such as virtualization software.

The virtualized infrastructure NFVI comprises a hardware interface PRES capable of providing physical computing resources PCPU (or PGPU, not shown), physical memory resources PMEM, physical network resources PNET, and possibly physical energy resources PEN.

The virtualized infrastructure NFVI also comprises a virtual interface VRES capable of providing virtual computing resources VCPU (or VGPU, not shown), virtual memory resources VMEM, virtual network resources VNET, and possibly virtual energy resources VEN.

The virtualized infrastructure NFVI further comprises a virtualization layer VL providing a link between the hardware interface PRES and the virtual interface VRES. The virtualization layer VL makes it possible to decouple the software implementation of network functions from the physical resources described above.

The network infrastructure R further comprises a module VNF-EMS, this module comprising virtual functions VNF1, VNF2, and VNF3 which can be executed on devices or components of the virtualized infrastructure NFVI.

These virtual functions VNF1, VNF2, and VNF3 are connected together to provide a network service, and are managed using corresponding elementary management systems EMS1, EMS2, and EMS3 which are configured to manage and orchestrate the resources of the virtualized infrastructure NFVI.

The network infrastructure R further comprises a management module NFV MAN configured to manage end-to-end network services.

The management module NFV-MAN comprises an orchestrator ORC which is responsible for the life cycle of network services at both the software and hardware level.

The management module NFV-MAN further comprises a virtual function manager VNFM, connected to module VNF-EMS, and in charge of the life cycle of the virtual functions VNF1, VNF2, and VNF3. The management module NFV-MAN makes it possible, in particular, to automate the deployment of virtual functions. It also makes it possible to control the creation and deletion of virtual machine or virtual function instances.

The management module NFV-MAN further comprises a virtualization manager VIM, connected to the other elements of the management module NFV MAN, and which is in charge of managing the resources of the virtualized infrastructure NFVI.

Furthermore, the management module NFV-MAN is connected to a service module OSS, which is configured to send it information such as profile information, domain information, commands from an operator or manager of the network infrastructure R, etc.

As illustrated, the network infrastructure R, and in particular the management module NFV-MAN of the virtualization manager VIM, is connected to a controller CTRL of the base stations RAN1 and RAN2.

These base stations, which are for example managed by a given telecommunications operator, each comprise devices which may be either physical or virtual, for example ordinary servers or virtual functions configured to process radio signals. Such virtual functions may be installed on ordinary servers or data centers.

In particular, the equipment of base station RAN1 comprises servers S11 and S12, while the equipment of base station RAN2 comprises servers S21 and S22. Each of these servers offers resources including computing, storage, network, and/or energy components. Advantageously, these resources can be dimensioned according to the constraints of the physical equipment or virtual functions capable of consuming them.

Furthermore, the equipment of base station RAN1 comprises a distribution device D1 while the equipment of base station RAN2 comprises a distribution device D2, each of these distribution devices being connected to the controller CTRL. These distribution devices D1 and D2 are typically equipped with power sensors capable of measuring, at any time, the electric power consumed by the base stations.

The controller CTRL is for example a monitoring device, such as a microcomputer, which is configured to know the electric power consumed by RAN1 and RAN2 based on the electric powers measured by D1 and D2.

The controller CTRL is further connected to a unit for supplying electric power, for example a power plant POW, itself connected to or comprising a set of batteries B1 to B5. These batteries may also be remote from the power station POW and connected separately to the base stations RAN1 and RAN2. In the case illustrated, batteries B1 to B3 supply electricity to base station RAN1 and batteries B4 and B5 supply electricity to base station RAN2. The distribution devices D1 and D2 manage the reception of electrical energy from the power plant POW and from the batteries connected to the station comprising them.

Preferably, the batteries comprise adaptive circuit breakers which are configured to adapt the amount of electric power supplied by these batteries to the equipment of the base stations. In this case, the controller CTRL is configured to modulate the maximum electric power threshold defined by these adaptive circuit breakers. The lower this threshold, the less the electric batteries will be able to supply electrical energy due to the modulation imposed by the circuit breakers, and therefore the lower the power consumed by the station powered by these batteries and the power station POW.

The controller CTRL is also configured to inform the network infrastructure R, and the distribution devices D1 and D2 of the base stations RAN1 and RAN2, of any significant variation in the power supply.

Thus, the controller CTRL can act on adaptive circuit breakers of the batteries, these adaptive circuit breakers modulating the corresponding maximum electric power threshold.

For example, when base station RAN1 needs to be supplied with a given electric power in an uninterrupted manner despite a sudden failure in the electrical supply cables between RAN1 and the power plant POW, the controller CTRL can not only act on the adaptive circuit breakers associated with batteries B1 to B3 to compensate for the absence of power supplied by the power station POW, but also on the adaptive circuit breakers associated with batteries B4 and B5 to allow these batteries to supply sufficient electric power to RAN1.

An interaction is thus possible between the controller CTRL, the batteries B1 to B5 of the base stations RAN1 and RAN2, and the network infrastructure R. In particular, the virtualization manager VIM of the network infrastructure R interacts with these elements in order to produce a dimensioning, between the base stations RAN1 and RAN2, of the electric power reserved by base station RAN1, here called the "current" station.

The controller CTRL comprises a technical environment domain TED, which will be described below. In particular, the connection between the network infrastructure R and the controller CTRL is made via an interface point NFVIMTE, which connects the technical environment domain TED to the virtualization manager VIM.

Figure 3:
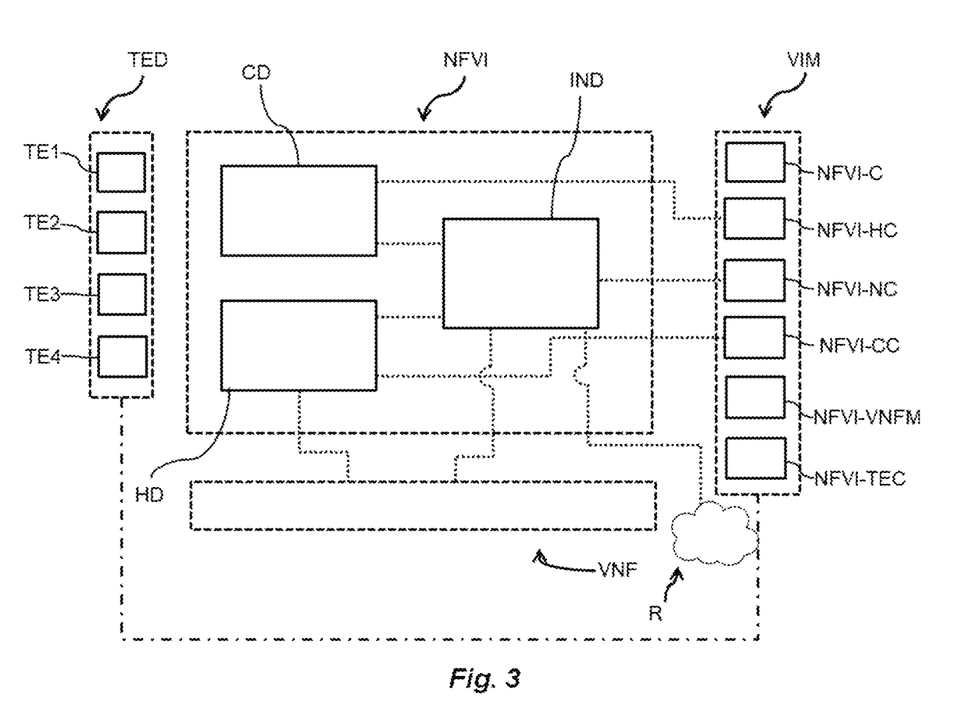
FIG. 3 represents a schematic view of a connection between a network infrastructure and a technical environment domain according to an exemplary embodiment.

Reference is now made to FIG. 3, which shows a schematic view of a connection between a network infrastructure R and a technical environment domain TED according to an exemplary embodiment.

The technical environment domain TED, which is generally comprised in a controller CTRL, comprises various modules configured to manage parameters of a base station. For example, the technical environment domain TED comprises a module TE1 responsible for the air conditioning within a room of the base station, a module TE2 responsible for the uninterruptible power supply ("UPS") providing stable alternating current to the base station equipment, a module TE3 responsible for supplying direct current to the base station equipment, and a module TE4 responsible for controlling the direct current voltage, for example a 400 VDC type of controller, of the base station.

In addition, the technical environment domain TED is configured to carry out an inventory or mapping of the electric powers reserved by one or more base stations to which it is connected. It is further configured to carry out an inventory or mapping of the electric powers measured at this or these base stations.

As previously described in the context of NFV architectures, the network infrastructure R comprises a module VNF-EMS, a virtualized infrastructure NFVI, and a virtualization manager VIM which are interconnected.

In particular, the virtualized infrastructure NFVI comprises a compute domain CD, a hypervisor domain HD, and a network infrastructure domain IND.

The compute domain CD comprises computer hardware resources and storage hardware resources, these resources being physical and usable for hosting virtual functions. The compute domain CD also provides an interface to the network infrastructure domain IND, but is not responsible for network connectivity between virtual functions.

The hypervisor domain HD comprises part of the virtualization layer VL, as well as virtual computing resources and virtual storage resources. The hypervisor domain HD is configured to manage the resources of the compute domain CD supporting the virtual machines and virtual functions executed on them. The hypervisor domain HD basically implements the virtualization layer VL between the physical and virtual computing resources of the virtualized infrastructure NFVI.

Virtual functions may run as software components on containers in the hypervisor domain HD, these containers running on physical hardware in the compute domain CD.

The network infrastructure domain IND comprises another part of the virtualization layer VL, virtual network resources as well as physical network resources. The network infrastructure domain IND is responsible for providing the connectivity required for communications between virtual functions and between these virtual functions and the entities responsible for their orchestration and management. Here, the network infrastructure domain IND is interfaced with the compute domain CD, and indirectly with the hypervisor domain HD.

The virtualization manager VIM comprises different modules, among which are a control module NFVI-C, a hypervisor control module NFVI-HC, a network control module NFVI-NC, a compute control module NFVI-CC, as well a technical environment control module NFVI-TEC. The virtualization infrastructure manager VIM further comprises a virtual function management module NFVI-VNFM. The technical environment control module NFVI-TEC is connected to the technical environment domain TED, located outside the network infrastructure R.

In particular, the technical environment control module NFVI-TEC is configured to map all the physical equipment, in particular servers, available to a base station.

As shown, the compute domain CD is connected to the instruction domain IND as well as to the hypervisor module NFVI-HC. The hypervisor domain HD is connected to module VNF-EMS, to the network infrastructure domain IND, as well as to the compute control module NFVI-CC. The network infrastructure domain IND is therefore connected to the compute domain CD and to the hypervisor domain HD, and furthermore is connected to the network control module NFVI-NC.

Figure 4:
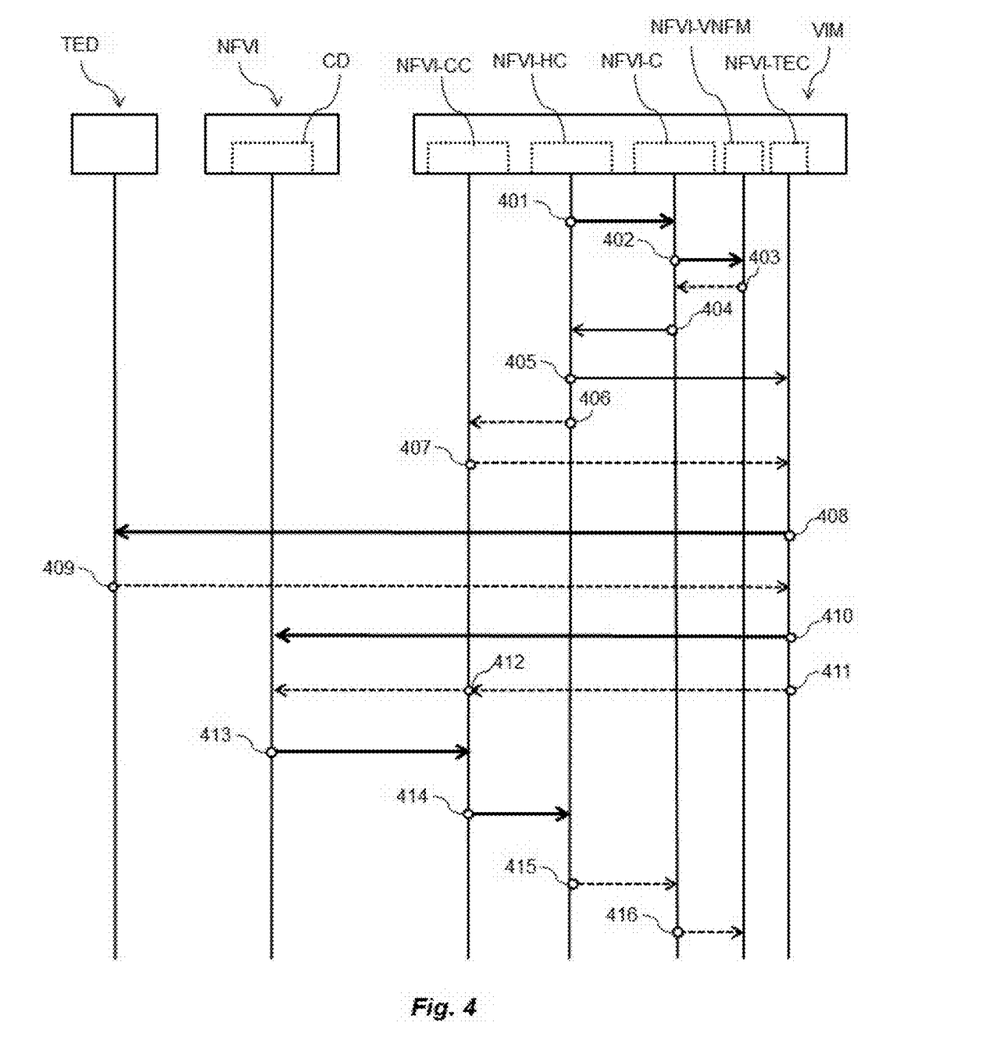
FIG. 4 represents, in the form of a flow diagram, the steps of a method for dimensioning a reserved electric power according to a first embodiment.

Reference is now made to FIG. 4, which represents a flow diagram illustrating various steps 401 to 416 of a method for dimensioning a reserved electric power according to a first embodiment.

This first embodiment corresponds, here, to the case of a request to increase a power reserved by a base station.

In particular, the above steps make it possible to implement a distribution of at least one type of resource between several base stations, for example via the activation of one or more servers of a specific base station among these several base stations and possibly by creating virtual machine or virtual function instances.

The compute control module NFVI-CC of the virtualization infrastructure manager VIM is configured to map the servers available to a given base station. The hypervisor control module NFVI-HC is configured to map all the servers of a given base station and also allows mapping any virtual machines present on any of these servers.

The technical environment domain TED is configured to map the powers reserved, and more generally the resources reserved, by a given base station, and to map the powers measured and the resources measured by this base station.

During step 401, the hypervisor control module NFVI-HC sends a message to the control module NFVI-C, this message being configured to notify it that a consumption overrun has been observed for a resource reserved by a virtual machine. This may involve for example exceeding the electric power reserved by a virtual machine or by an instance of a virtual function among the virtual functions VNF1, VNF2, and VNF3 of module VNF-EMS of the network infrastructure R.

During step 402, the control module NFVI-C sends a message to the virtual function management module NFVI-VNFM, this message comprising a "scale-out" request for a current virtual function instance.

Optionally, during step 403, after receiving the message during step 402, the virtual function management module NFVI-VNFM sends to the control module NFVI-C a response message comprising a request to instantiate a new virtual function, for example for the purpose of creating a new virtual machine.

During step 404, either upon receipt of the message sent during step 401 by the hypervisor control module NFVI-HC, or upon receipt of the response message sent during step 403 by the virtual function management module NFVI-VNFM, the control module NFVI-C sends a message to the hypervisor control module NFVI HC to request a resource of a given type. Preferably, this resource is a virtual energy resource. This resource may also be a virtual computing resource, a virtual memory resource, or a virtual network resource.

During step 405 following step 404, the hypervisor control module NFVI-HC sends to the technical environment control module NFVI-TEC a message requesting activation of a standby server, this message being configured to allow selection of the server or servers to be activated in a given list.

Optionally, step 405 comprises two intermediate steps 406 and 407, step 406 comprising the sending of this message from the hypervisor control module NFVI-HC to the compute control module NFVI-CC and step 407 comprising the sending of this message from the compute control module NFVI-CC to the technical environment control module NFVI-TEC.

As a reminder, the compute control module NFVI-CC is configured to map, in association with the hypervisor control module NFVI-HC, the servers of the base stations. In addition, the compute control module NFVI-CC is configured to plan the time and the location of an allocation of a resource on a server.

Advantageously, the message received by the compute control module NFVI-CC during step 406 thus makes it possible to provide useful information for instantiating a virtual function. In particular, this facilitates, during the implementation of subsequent steps, an allocation of a resource on a server at the same time as an activation of a virtual function instance.

During step 408, the technical environment control module NFVI-TEC sends the technical environment domain TED a request to increase the power reserved by the base station. In particular, this request may be directly transmitted to a controller CTRL connected to an electric power plant or to electric batteries supplying one or more base stations.

Optionally, step 409 comprises the sending of a confirmation message in response to the message from step 408, by the technical environment domain TED to the technical environment control module NFVI-TEC. This message makes it possible to confirm the request to increase the power reserved by the base station.

During step 410, the technical environment control module NFVI-TEC sends, to the compute domain CD of the virtualized network function infrastructure NFVI, a standby server activation request. This request may correspond to the request previously received during step 405, and it is sent after the corresponding confirmation message in step 409.

Optionally, step 410 comprises two intermediate steps 411 and 412, step 411 comprising a sending of the activation request from the technical environment control module NFVI-TEC to the compute control module NFVI-CC and step 412 comprising the sending of this message from the compute control module NFVI CC to the compute domain CD.

During step 413, the compute domain CD activates a server on standby and confirms this activation by sending a corresponding message to the compute control module NFVI-CC.

During step 414, the compute control module NFVI-CC sends to the hypervisor control module NFVI-HC a message confirming the activation of a standby server.

Optionally, during step 415, the hypervisor control module NFVI-HC implements an allocation of a resource on the activated server, in particular a resource of the same type as that required by the message sent to the hypervisor control module NFVI-HC during step 404. In addition, step 415 comprises an activation of a virtual machine or virtual function instance on the activated server. The control module NFVI-C is notified of this allocation and this activation.

Optionally, during step 416, and upon receipt of the allocation and activation notification from step 415, the control module NFVI-C sends a message confirming activation of the instance to the virtual function management module NFVI-VNFM.

This makes it possible to provide a method for distributing the reserved electric power between several base stations, in accordance with a request to increase the power reserved by at least one current base station among a plurality.

Figure 5:
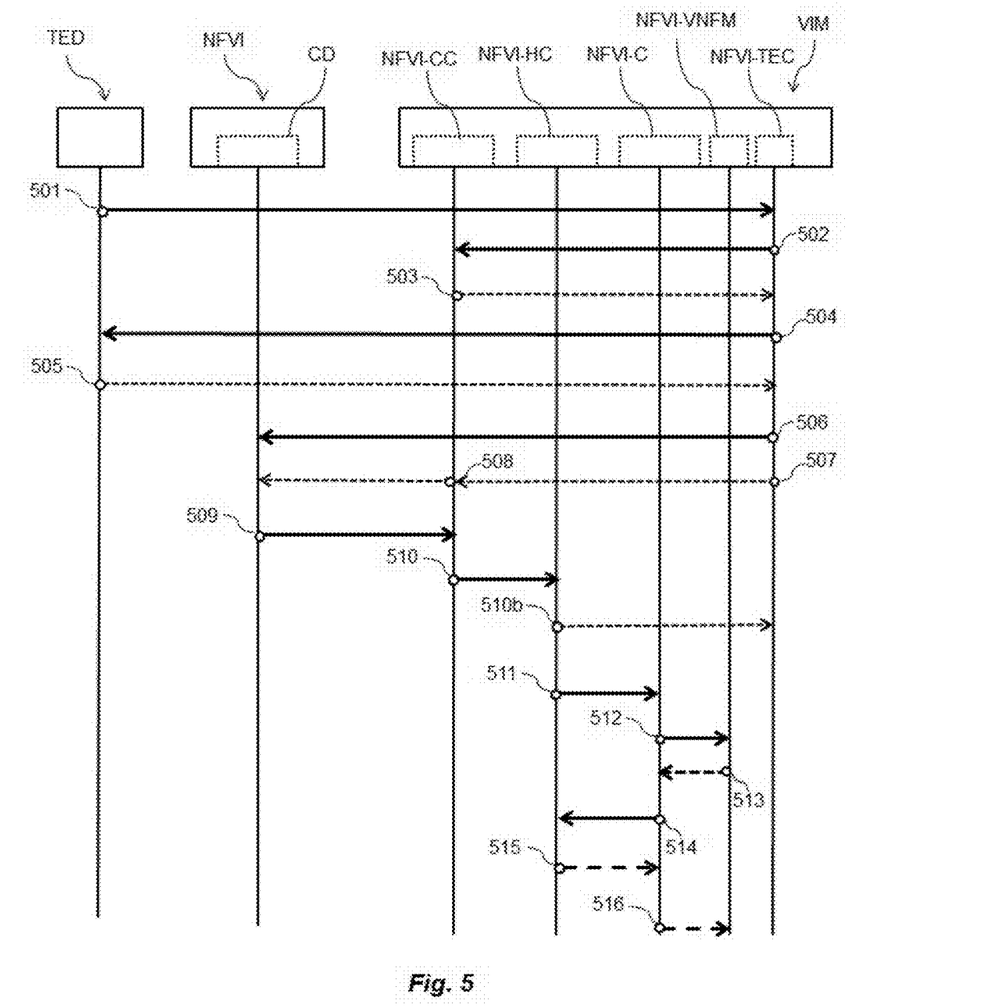
FIG. 5 represents, in the form of a flow diagram, the steps of a method for dimensioning a reserved electric power according to a second embodiment.

Reference is now made to FIG. 5, which represents a flow diagram illustrating various steps 501 to 516 of a method for dimensioning a reserved electric power according to a second embodiment.

This second embodiment corresponds, here, to the case where a power reserved by a base station is exceeded.

As in the first embodiment, the above steps make it possible to implement a distribution of at least one type of resource between several base stations by activating one or more servers of a specific base station among these base stations and optionally creating virtual machine or virtual function instances.

In the present case, however, a notification of power reserved by a current base station is initially provided to the virtualization infrastructure manager VIM by the technical environment domain TED.

In particular, during step 501, the technical environment domain TED sends this notification to the technical environment control module NFVI-TEC.

The technical environment control module NFVI-TEC, which is configured to map the servers of the base stations, can also select a standby server among these to activate. During step 502, and in response to the notification received during step 501, the technical environment control module NFVI-TEC sends a request to activate a standby server to the compute control module NFVI-CC.

Optionally, during step 503, the compute control module NFVI-CC sends a response message to the technical environment control module NFVI-TEC, this response message comprising an indication of a standby server available for activation in a list of servers.

Steps 504, 505, 506, 507, 508, 509, and 510 are respectively similar to steps 408, 409, 410, 411, 412, 413, and 414 of the first embodiment.

Optionally, during a step 510*b* following step 510, the hypervisor control module NFVI-HC sends to the technical environment control module NFVI-TEC the message confirming activation of a standby server so that it is informed accordingly.

During step 511, following step 509, 510, and/or 510*b*, the hypervisor control module NFVI-HC implements an identification of the virtual machine or the virtual function instance where the reserved electric power was exceeded in connection with the exceeded-reserve notification of step 501. The control module NFVI-C is notified of the identification.

During step 512, the control module NFVI-C sends a message to the virtual function management module NFVI-VNFM, this message comprising a "scale-out" request for the identified virtual machine or the identified virtual function instance.

Optionally, during step 513, and in the response received during step 512, the virtual function management module NFVI-VNFM sends a request to create a new virtual machine or virtual function instance to the control module NFVI-C.

During step 514, and as in step 404 of the first embodiment, the control module NFVI-C sends a message to the hypervisor control module NFVI-HC in order to request a resource from it, preferably a virtual energy resource, or another resource such as a virtual computing resource, a virtual memory resource, or a virtual network resource.

Optionally, steps 515 and 516 are then implemented, steps 515 and 516 being respectively similar to steps 415 and 416 of the first embodiment.

This makes it possible to provide a method for distributing the reserved electric power between several base stations, in accordance with a request to increase the power reserved by at least one current base station.

Figure 6:
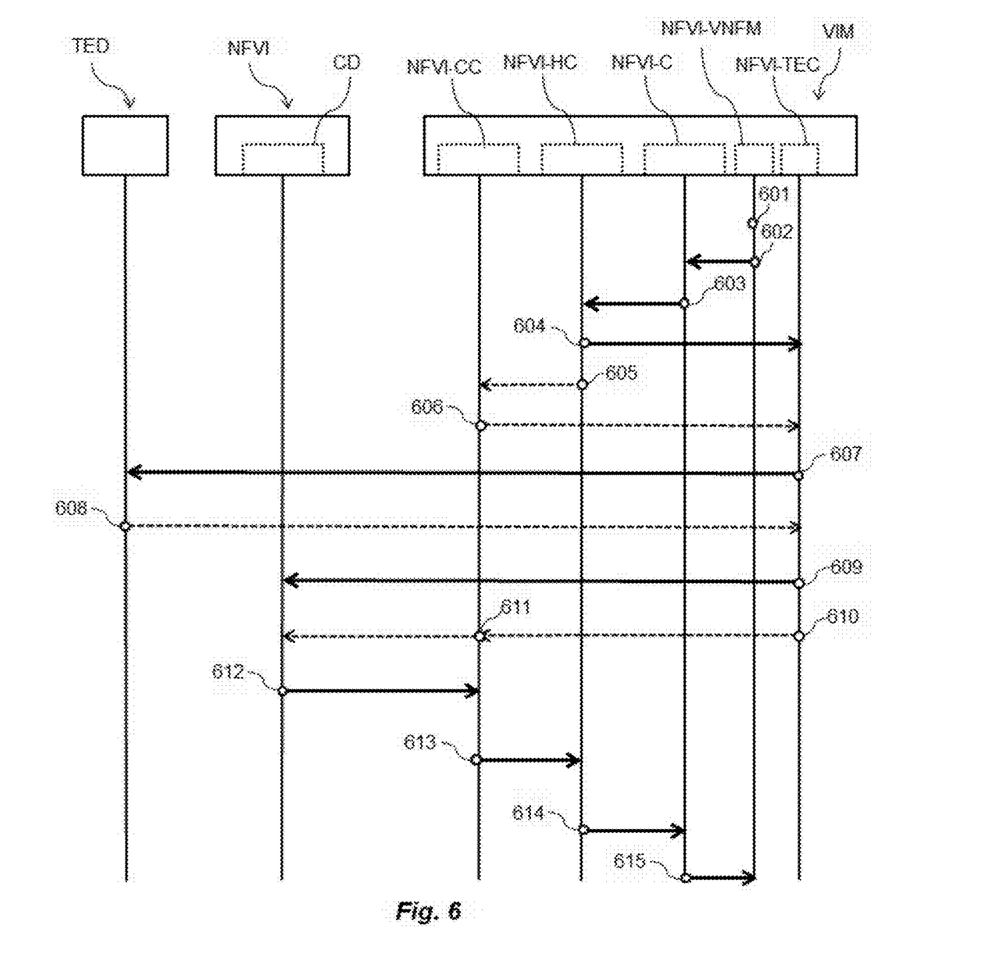
FIG. 6 represents, in the form of a flow diagram, the steps of a method for dimensioning a reserved electric power according to a third embodiment.

Reference is now made to FIG. 6, which represents a flow diagram illustrating various steps 601 to 615 of a method for dimensioning an electric power reserved by a base station according to a third embodiment.

This third embodiment corresponds, here, to the case of an increase in traffic on a virtual function of the network infrastructure.

As in the first and second embodiments, the above steps make it possible to implement a distribution of at least one type of resource between several base stations by activating one or more servers of a specific base station among these base stations and possibly creating virtual machine or virtual function instances.

In the present case, however, a message comprising a "scale-out" request for a virtual machine or virtual function instance is initially delivered to the virtualization infrastructure manager VIM.

In particular, during step 601, a virtual machine or virtual function instance (not shown) sends this message to the virtual function management module NFVI-VNFM of the virtualization infrastructure manager VIM.

During step 602, the virtual function management module NFVI-VNFM sends a message to the control module NFVI-C, this message comprising a request to create a virtual machine or virtual function instance.

Steps 603, 604, 605, 606, 607, 608, 609, 610, 611, 612, 613, and 614 are respectively similar to steps 404, 405, 406, 407, 408, 409, 410, 411, 412, 413, 414, and 415 of the first embodiment. Similarly, steps 607, 608, 609, 610, 611, 612, 613, 614, and 615 are respectively similar to steps 504, 505, 506, 507, 508, 509, 510, 511 and 512 of the second embodiment.

This makes it possible to provide a method for distributing the reserved electric power between several base stations, in accordance with a "scale-out" request following an increase in traffic on a virtual function instance or on a virtual machine.

Figure 7:
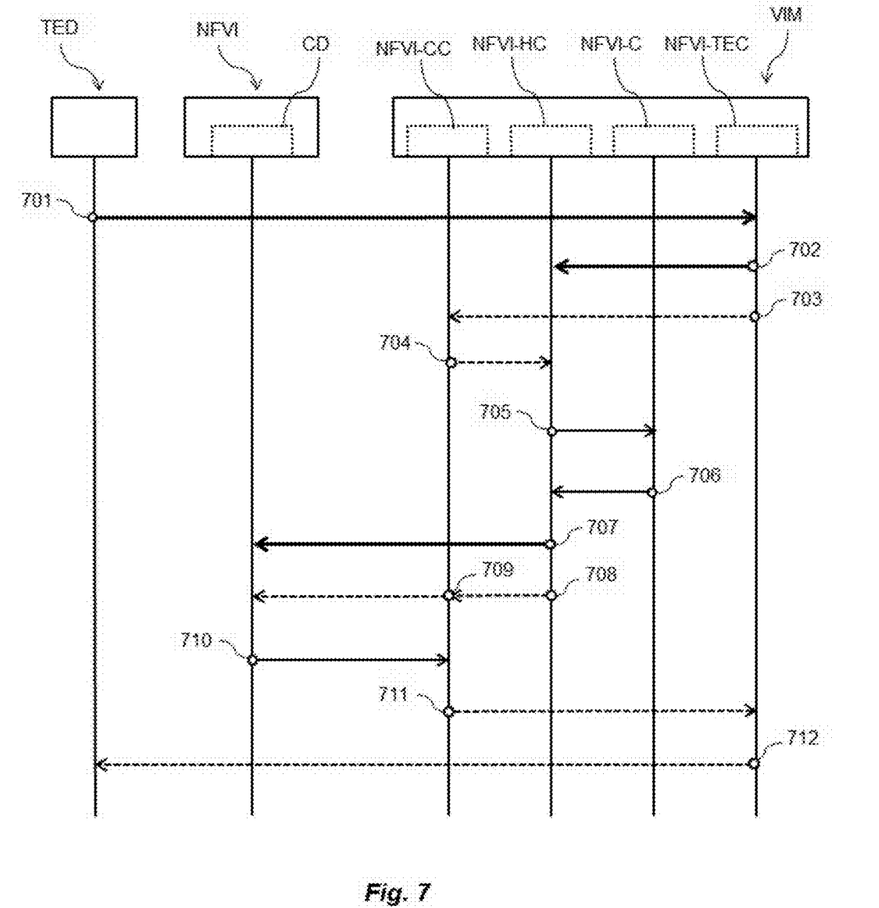
FIG. 7 represents, in the form of a flow diagram, the steps of a method for dimensioning a reserved electric power according to a fourth embodiment.

Reference is now made to FIG. 7, which represents a flow diagram illustrating various steps 701 to 712 of a method for dimensioning an electric power reserved by a base station according to a fourth embodiment.

This fourth embodiment corresponds, here, to the case of a request to decrease a power reserved by a base station.

In particular, the above steps make it possible to implement a distribution of at least one type of resource between several base stations by turning off one or more servers of a specific base station among these base stations and optionally by deleting virtual machine or virtual function instances.

In the present case, a notification of a decrease in power consumed by a base station is initially provided to the virtualization infrastructure manager VIM by the technical environment domain TED.

In particular, during step 701, the technical environment domain TED sends this notification to the technical environment control module NFVI-TEC of the virtualization infrastructure manager VIM. For example, this request may be issued upon the observation, by the technical environment domain TED, of the fact that the power consumed by a base station is less than the power reserved by said station.

During step 702, and in response to the notification received during step 701, the technical environment control module NFVI-TEC sends a message comprising a request to shut down a server, to the hypervisor control module NFVI-HC. Preferably, this message allows selecting the server(s) to be shut down, from a given list. The hypervisor control module NFVI-HC is then responsible for selecting the server(s) to shut down.

Optionally, step 702 comprises two intermediate steps 703 and 704, step 703 comprising a sending of the shutdown request from the technical environment control module NFVI-TEC to the compute control module NFVI-CC, and step 704 comprising the sending of this message from the compute control module NFVI-CC to the hypervisor control module NFVI-HC.

During step 705, the hypervisor control module NFVI-HC implements an identification of a virtual machine or virtual function instance to be deleted. The control module NFVI-C is notified of this identification.

Optionally, following step 705, the control module NFVI-C may send to the virtual function management module NFVI-VNFM, which is not shown here, a request to clear a resource on the identified virtual machine or virtual function instance.

During step 706, the control module NFVI-C sends a message to the hypervisor control module NFVI-HC to implement a release of a resource, preferably a virtual energy resource, or another resource such as a virtual computing resource, a virtual memory resource, or a virtual network resource.

During step 707, the hypervisor control module NFVI-HC sends, to the compute domain CD of the virtualized network function infrastructure NFVI, a request to shut down a server. This request may correspond to the request previously received during step 702.

Optionally, step 707 comprises two intermediate steps 708 and 709, step 708 comprising a sending of the shutdown request from the hypervisor control module NFVI-HC to the compute control module NFVI-CC, and step 704 comprising the sending of this message from the compute control module NFVI CC to the compute domain CD.

During step 710, the compute domain CD shuts down a server and confirms this by sending a corresponding message to the compute control module NFVI-CC.

Optionally, during step 711, the compute control module NFVI-CC sends a notification indicating the shutdown of the server, to the technical environment control module NFVI-TEC.

Optionally, during step 712, upon receipt of this notification, the technical environment control module NFVI-TEC sends a message to the technical environment domain TED, this message confirming the reduction in power consumed by the base station.

This makes it possible to provide a method for distributing the reserved electric power between several base stations, in accordance with a request to reduce the power reserved by a base station, in particular a "scale-in" request.

Figure 8:
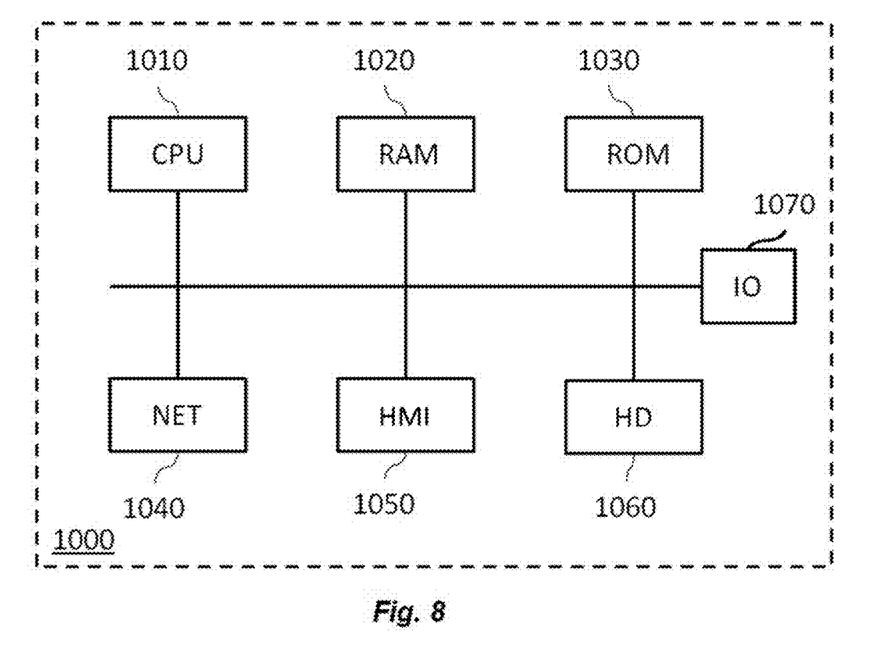
FIG. 8 represents a schematic block diagram of a processing circuit according to an exemplary embodiment.

FIG. 8 represents a schematic block diagram of a computer processing circuit according to an example implementation.

According to one example, said computer processing circuit is a processor.

In particular, this computer processing circuit is a system on chip 1000. For example, the system on chip 1000 is suitable for integration into a scheduler ORD intended to be connected to a network infrastructure R, and is configured to implement a method for dimensioning a reserved electric power according to any of the embodiments described above.

The system on chip 1000 comprises a communication bus connected, for example, to a central processing unit 1010, such as a processor or a microprocessor, and denoted CPU.

The system on chip 1000 further comprises a random access memory 1020, denoted RAM, for storing the executable code of the dimensioning method as well as registers suitable for For implementing the method according to the embodiments described above, the memory capacity of the system on chip 1000 may be supplemented by an optional RAM memory connected to an expansion port, for example.

In addition, the system on chip 1000 comprises a read-only memory 1030, denoted ROM, for storing computer programs for implementing the embodiments described above, as well as a network interface 1040 which is normally connected to a communication network over which are sent or received the digital data to be processed.

The network interface 1040 may be a single network interface or may be composed of a set of different network interfaces (e.g. wired and wireless, interfaces or different types of wired or wireless interfaces).

Data packets are sent over the network interface for transmission or are read from the network interface for reception, under the control of the software application executed in the processor or microprocessor 1010.

Furthermore, the system on chip 1000 includes a user interface 1050 for receiving input from a user or for displaying information to a user, an optional storage medium 1060 denoted HD.

The system on chip 1000 further includes an input-output module 1070, denoted IO, for receiving and sending data from or to external peripherals such as a hard disk, a removable storage medium, or others. In particular, the input-output module 1070 allows receiving a notification such as a dimensioning request from a device connected to the system on chip 1000.

In an example presented here, the executable code may be stored in read-only memory 1030, on the storage medium 1060, or on a digital removable medium such as a disc for example.

According to an alternative, the executable code of the programs may be received by means of a communication network, via the network interface 1040, in order to be stored in the storage medium 1060, before being executed.

The central processing unit 1010 is suitable for controlling and directing the execution of instructions or software code portions of the program or programs according to one of the exemplary embodiments described above, these instructions being stored in one of the aforementioned storage means. After powering on, the CPU 1010 is able to execute instructions stored in the main RAM memory 1020, relating to a software application, after these instructions have been loaded from ROM for example.

In particular, the central processing unit 1010 and/or the network interface 1040 are suitable for modifying the parameters of at least one server. The central processing unit 1010 and/or the network interface 1040 are also suitable for controlling a virtual computing resource of the network infrastructure according to the configuration of a server.

For example, the configuration of a server comprises the activation, shutdown, placement on standby of this server, or the control of a computing resource associated with this server, for example freeing a resource of or allocating a resource to this server.

In the example shown here, the system on chip 1000 is a programmable device that uses software. However, alternatively, this description may be implemented in any type of hardware (for example, in the form of a dedicated integrated circuit or ASIC).

The invention claimed is:

1. A method of dimensioning an electric power reserved by at least one current base station among a plurality of base stations that are connected to a virtualization manager of a network infrastructure, the virtualization manager being a device configured to enable and be able to guarantee the supply of electric power to the plurality of base stations, the method being implemented by the virtualization manager, the method comprising the following acts:
    receiving a request for dimensioning the reserved electric power allocated to the at least one current base station;
    configuring, according to the dimensioning request, at least one server hosted by the at least one current base station; and
    controlling, according to the configuration of the at least one server, at least one virtual computing resource of the network infrastructure, the virtual computing resource being executed on the at least one server, the virtual computing resource consuming a part of a server-specific reserved electric power, wherein the server-specific reserved electric power is a component of the reserved electric power allocated to the at least one current base station hosting the at least one server, so as to dimension the reserved electric power allocated to the at least one current base station, and
    wherein the dimensioning request comprises a notification that the reserved electric power has been exceeded, the exceeded-reserve notification being issued by a hypervisor module comprised in the virtualization manager.

2. The method according to claim 1, wherein configuring the at least one server comprises a shutdown of the server, and the control of the at least one virtual computing resource comprises releasing, by a control module comprised in the virtualization manager, of the at least one virtual computing resource so as to reduce the reserved electric power.

3. The method according to claim 2, wherein the dimensioning request comprises a request to reduce the reserved electric power, the request to reduce the reserved electric power being sent by an electric power control device to an environmental control module comprised in the virtualization manager, the electric power control device being connected to the at least one current base station.

4. The method according to claim 2, wherein releasing the at least one virtual computing resource comprises, upon shutdown of the server, deleting of at least one virtual function in the network infrastructure, the deletion being implemented by a virtual functions management module comprised in the virtualization manager.

5. The method according to claim 1, wherein the configuration of the at least one server comprises an activation of the server, and the control of the at least one virtual computing resource comprises an allocation, by a control module comprised in the virtualization manager, of the at least one virtual computing resource on the activated server.

6. The method according to claim 5, wherein the dimensioning request comprises a notification of an increase in traffic issued by a virtual functions management module comprised in the virtualization manager.

7. The method according to claim 5, wherein the allocation of the at least one virtual computing resource comprises, upon activation of the server, an instantiation of at least one virtual function in the network infrastructure, the instantiation being implemented by a virtual functions management module comprised in the virtualization manager.

8. The method according to claim 1, wherein the at least one virtual computing resource is an electric power virtual computing resource comprising a component selected among a compute component, a storage component, a memory component, and a network component.

9. A processing circuit comprising a processor and a memory, the memory storing program code instructions of a computer program for implementing the method according to claim 1, when the instructions are executed by the processor of the processing circuit.

10. A non-transitory storage medium, removable or non-removable, partially or entirely readable by a computer or a processor, comprising code instructions of a computer program for the execution of the method according to claim 1.

11. A virtualization manager system of a network infrastructure, the virtualization manager system being comprised of processing circuitry and memory storing instructions that, when executed by the processing circuitry, configure the virtualization manager system as a device configured to enable and be able to guarantee the supply of electric power to a plurality of base stations, the virtualization manager system being further configured to dimension an electric power reserved by at least one current base station among the plurality of base stations connected to the virtualization manager system, the virtualization manager system comprising:
    a virtual functions management module comprising processing circuitry configured to receive a request for dimensioning the reserved electric power allocated to the at least one current base station;
    an environmental control module comprising processing circuitry configured to configure, according to the dimensioning request, at least one server hosted by the at least one current base station; and
    a hypervisor module comprising processing circuitry configured to control at least one virtual computing resource of the network infrastructure, the virtual computing resource being executed on the at least one server, the virtual computing resource consuming a part of a server-specific reserved electric power, wherein the server-specific reserved electric power is a component of the reserved electric power allocated to the at least one current base station hosting the at least one server, so as to dimension the reserved electric power allocated to the at least one current base station, and wherein the dimensioning request comprises a notification that the reserved electric power has been exceeded, the exceeded-reserve notification being issued by the hypervisor module.

12. A system comprising a virtualization manager according to claim 11 and the plurality of base stations configured to be connected to the virtualization manager.

* * * * *